May 29, 1951           O. A. SUTTON           2,554,602
COWL FOR FANS
Filed Oct. 10, 1949                           2 Sheets-Sheet 2
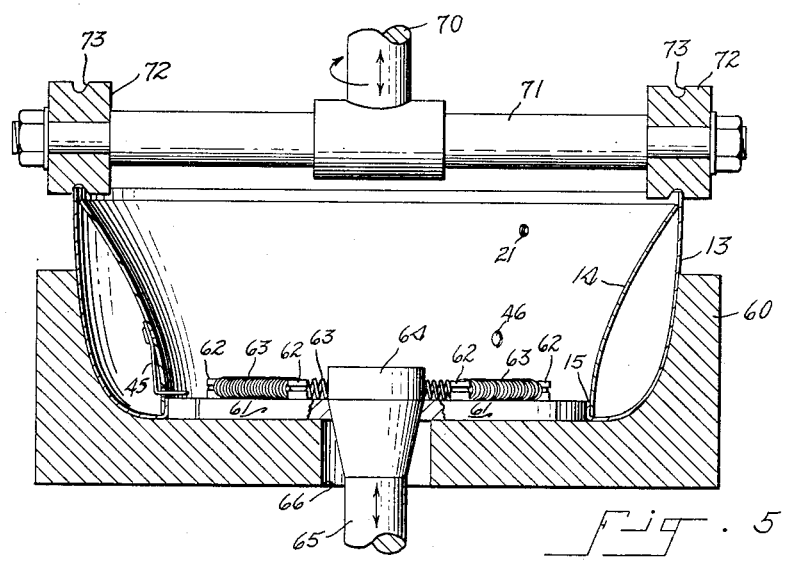
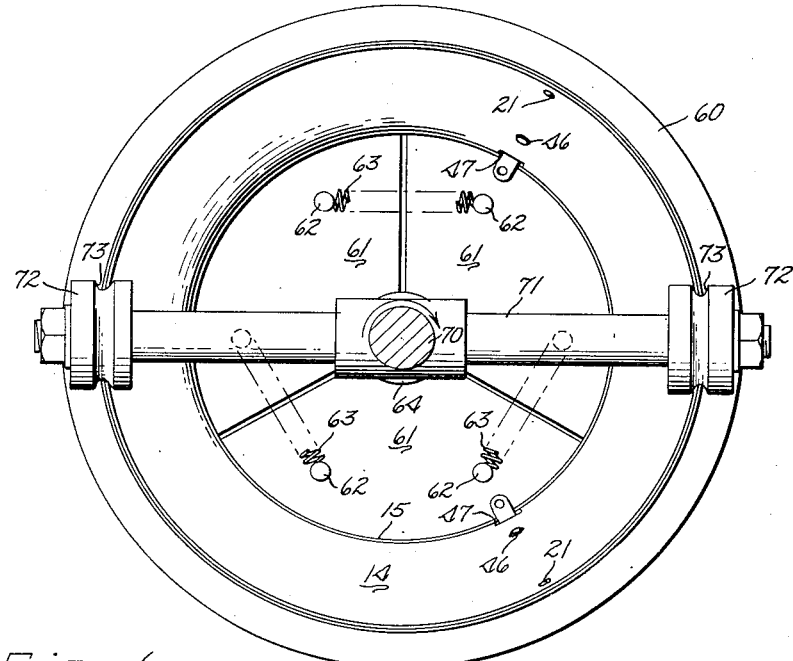
INVENTOR.
Ottis A. Sutton
BY Buckhorn and Cheatham
Attorneys Patented May 29, 1951

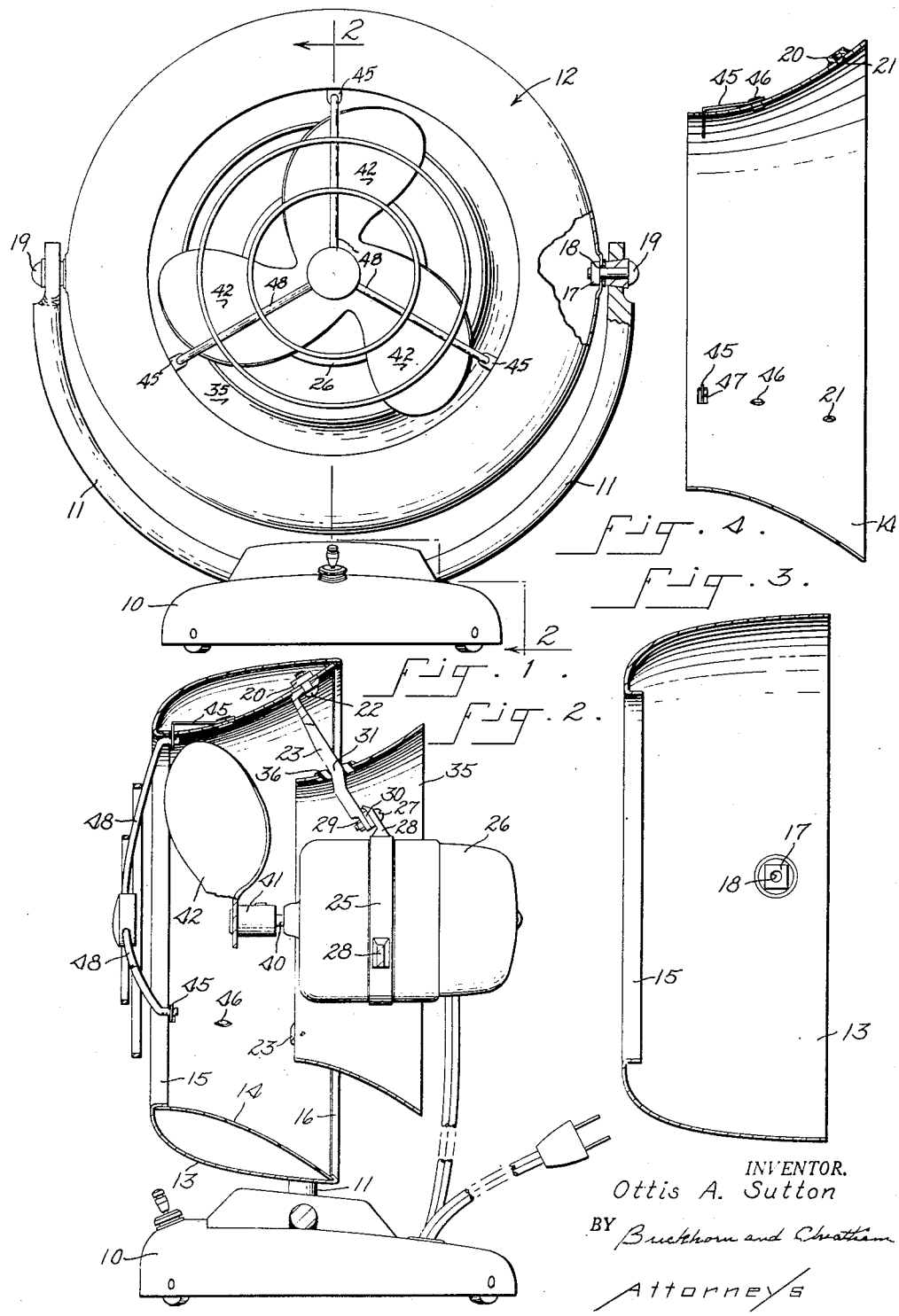

2,554,602

UNITED STATES PATENT OFFICE 2,554,602

COWL FOR FANS

Ottis A. Sutton, Wichita, Kans., assignor to The O. A. Sutton Corporation, Inc., Wichita, Kans., a corporation of Kansas Application October 10, 1949, Serial No. 120,504

1 Claim. (Cl. 230—274)

My present invention relates to a cowl for a fan, the same comprising a hollow annulus of aerofoil cross-section having its sharp end of larger diameter than its blunt end whereby air may be moved through the cowl by an impeller without excessive turbulence. The present application is concerned with an improvement in the cowl and in the method of manufacturing the cowl whereby great economies in manufacturing expense are achieved and more efficient, quiet operation of the fan is achieved.

The foregoing and other objects and advantages of the present invention will be more readily ascertained from inspection of the following specification taken in connection with the accompanying drawings wherein like numerals refer to like parts throughout, while the features of novelty will be more distinctly pointed out in the appended claim.

In the drawings,

Fig. 1 is a front elevation of a fan embodying the cowl of the present invention;

Fig. 2 is a vertical section taken substantially along line 2—2 of Fig. 1;

Fig. 3 is a vertical section of the outer ring of the cowl;

Fig. 4 is a vertical section through the inner ring of the cowl;

Fig. 5 is a vertical section through apparatus for uniting the two rings to form the cowl; and Fig. 6 is a plan view of the apparatus illustrated in Fig. 5.

The present invention is herein illustrated as comprising a portion of a fan having details illustrated and claimed in my concurrently executed applications Serial Nos. 120,502 and 120,503, but it is to be appreciated that the present invention may be utilized in other types of fans.

The fan herein illustrated comprises a base 10 from which a pair of yoke arms 11 extend upright in spaced relation to embrace the cowl 12. The cowl 12 comprises a hollow annulus formed by complementarily interlocking an outer ring 13 having substantially the shape of the surface of a spherical zone and an inner ring 14 comprising a belled annulus. The two rings are interlocked by providing an inwardly directed peripheral flange 15 on the smaller end of the outer ring which is capable of snugly fitting within the smaller end of the inner ring, and, after interfitting the two rings in this fashion, bending or rolling the opposite end of the outer ring over the larger end of the inner ring to provide a flange 16 embracing the inner ring.

Prior to assembling the two rings, means are provided on each ring for supporting the cowl and for mounting air impelling apparatus and the like within the cowl. As herein illustrated, the cowl supporting means preferably comprises a plurality of nuts 17 welded, soldered, or otherwise affixed to the inner surface of the ring 13 in concentric relation to openings 18 through the ring. Complementary threaded fastening members 19 in the ends of the arms 11 may extend through the openings 18 into cooperative association with the nuts 17 whereby the cowl is mounted in position with respect to the base 10. Preferably in accordance with the present invention there are a pair of cowl mounting means, one on each side of the cowl along a diameter thereof, so that the cowl may be canted to various angular positions with respect to the horizontal.

Preferably the mounting means for the air impeller comprises a plurality of nuts 20 welded, soldered or otherwise affixed to the outer surface of the inner ring in concentric relation to openings 21 extending therethrough, and cooperatively engaged threaded fastening members 22 which may extend through the openings 21 into engagement with the nuts 20. A plurality of such mounting means may be provided for holding the ends of radially extending arms 23 which are connected to a ring 25 surrounding a motor 26, the connection preferably being by means of a screw 27 passing through lugs 28 on the ring 25 and the inner ends of the arms 23 into engagement with nuts 29, the arms 23 and 28 being spaced apart by resilient washers 30. Each of the arms 23 may be offset at an intermediate point as indicated at 31 so as to concentrically locate a flaring air-guiding funnel 35 which divides the inlet end of the fan into a plurality of inwardly tapering, curved air passages. Preferably the funnel 35 is supported through the medium of resilient grommets 36. The motor 26 includes a forwardly projecting shaft 40 upon which is mounted the hub 41 of a bladed impeller including radially extending blades 42. The arms 23 are so arranged with respect to the cowl as to support the impeller for rotation about the axis of the cowl in the region of the smaller end thereof, and to support the funnel 35 so that its larger end projects rearwardly from the larger end of the cowl and its inner end extends into the larger end of the cowl to within a short distance of the blades of the fan.

Other mounting members may be associated with the inner ring such as the grille mounting members 45 comprising a plurality of leaf springs having a portion fastened to the outer surface of the inner ring by means of rivets 46 extending through openings therein and having their free ends bent laterally and projecting into the ring through openings 47. Each of the members 45 engages an end of a radial rod 48 forming a portion of a front grille. The members 45 are associated with the inner ring prior to its assembly to the outer ring. It is to be appreciated that each of the rings may be formed in a single stamping operation from a flat sheet of metal and, if desired, the die so employed may punch the openings with which are associated the various mounting members. A minimum amount of labor is thus required to provide an aerofoil cowl which may be incorporated into a fan of the character disclosed.

As will be seen clearly in Fig. 5, the two rings may be united by simple, efficient means. The preferred mechanism for so doing comprises a bed 60 in the shape of a cup capable of snugly receiving the smaller end and most of the side wall of the outer ring. Within the cup are a plurality of chuck jaw plates 61 each in the form of a circular sector of a radius slightly less than the radius of the flange 15. A plurality of pins 62 are mounted on each sector and a plurality of springs 63 extend between pins on adjacent sectors, with the springs being arranged substantially along chords of a circle so that normally the sectors will have their radial edges in engagement and the diameter of the circle will be constricted to permit insertion of the ring into the cup. An expanding wedge member 64 is disposed concentrically within the bed 60 at the upper end of an operating rod 65 extending through a central opening 66 in the bottom of the cup. Means (not shown) of any suitable nature may be provided to reciprocate the rod 65 so as to force the chuck jaws outwardly against the tension of the springs to clamp the outer ring in position. The inner ring is then fitted into the outer ring and the protruding edge of the outer ring is flanged inwardly over the large end of the inner ring. Means for accomplishing this operation preferably comprise a rotatable and vertically movable shaft 70, the lower end of which supports a crossbar 71. Each end of the crossbar 71 supports a flanging roller 72 having an annular flanging groove 73 therein suitable for the purpose of rolling the edge of the outer ring over the edge of the inner ring. Apparatus which may be adapted to this purpose with a minimum of modification is of the type commonly known as a drill press. By means of such apparatus the rollers 72 may be lowered into engagement with the edge of the ring and rapidly revolved while downward pressure is being exerted. It will be observed that by this method a firmly united assembly may be created since not only is the flange formed on the inlet end of the cowl but pressure may be exerted to cause the inner ring to be firmly gripped between the flanges of the outer ring.

Having illustrated and described a preferred embodiment of the present invention, it will be apparent to those skilled in the art that the invention permits of modification in arrangement and detail. I claim as my invention all such modifications as come within the true spirit and scope of the appended claim.

I claim:

A fan comprising a cowl, said cowl comprising a hollow annulus formed of two interlocked sheet-metal rings having their ends joined together, the outer of said rings being substantially in the shape of the surface of a spherical zone and the inner of said rings comprising a belled annulus, each of said rings having a plurality of small openings therethrough, a plurality of nuts mounted on the inner surface of each of said rings with each of said nuts surrounding one of said openings, means for supporting said cowl comprising threaded fastening members extending through the openings in said outer ring and cooperatively engaged with the nuts associated therewith, air propelling means mounted coaxially within said cowl, and means for supporting said propelling means comprising a plurality of threaded fastening members extending through the openings in said inner ring and cooperatively engaged with the nuts associated therewith.

OTTIS A. SUTTON.

REFERENCES CITED

The following references are of record in the file of this patent:

UNITED STATES PATENTS

| Number | Name | Date |
|---|---|---|
| 868,987 | Hewitt | Oct. 22, 1907 |
| 1,567,700 | Bongiovanni | Dec. 29, 1925 |
| 2,123,657 | Munk | July 12, 1938 |